United States Patent

Brutscher et al.

[11] Patent Number: 6,095,024
[45] Date of Patent: Aug. 1, 2000

[54] MITER FENCE-BOX JOINT FIXTURE

[75] Inventors: David T. Brutscher, Louisville; L. R. Leet Sr., Shelbyville; Gregory A. Phillips, LaGrange; John P. Speigelhalter, Prospect, all of Ky.

[73] Assignee: Vermont American Corporation, Louisville, Ky.

[21] Appl. No.: 09/089,829

[22] Filed: Jun. 3, 1998

[51] Int. Cl.[7] ................................................ B26D 7/01
[52] U.S. Cl. ...................... 83/35; 83/581; 83/435.12; 83/435.15; 83/437.2; 144/253.1
[58] Field of Search ................................. 83/581, 435.12, 83/435.13, 435.14, 435.15, 437.2, 35, 875; 144/253.1, 253.3, 204.2; 269/299, 304

[56] References Cited

U.S. PATENT DOCUMENTS

| | | |
|---|---|---|
| 2,750,970 | 6/1956 | Gaskell . |
| 2,787,301 | 4/1957 | Anderson . |
| 2,884,965 | 5/1959 | Stahl . |
| 2,916,063 | 12/1959 | Boekenkamp ..................... 83/431 X |
| 2,972,366 | 2/1961 | Caruso ............................... 83/431 X |
| 3,083,744 | 4/1963 | Vold . |
| 4,051,759 | 10/1977 | Oliff .................................... 83/581 X |
| 4,111,409 | 9/1978 | Smith . |
| 4,256,000 | 3/1981 | Seidel . |
| 4,327,619 | 5/1982 | McNamee, Jr. . |
| 4,798,113 | 1/1989 | Viazanko ............................. 83/581 X |
| 4,875,399 | 10/1989 | Scott et al. ........................... 83/581 X |
| 5,016,693 | 5/1991 | Haffely et al. ..................... 144/253.2 |
| 5,038,486 | 8/1991 | Ducate, Sr. ..................... 83/435.14 X |
| 5,042,346 | 8/1991 | McCann . |
| 5,090,283 | 2/1992 | Noble . |
| 5,297,463 | 3/1994 | O'Banion et al. . |
| 5,337,641 | 8/1994 | Duginske . |
| 5,768,966 | 6/1998 | Duginske ........................... 83/468 X |

*Primary Examiner*—M. Rachuba
*Assistant Examiner*—Ana Luna
*Attorney, Agent, or Firm*—McDermott, Will & Emery

[57] ABSTRACT

In order to enable both miters and box joints to be fabricated using the same piece of apparatus, a miter fence is provided with multiple slidable portions or segments which enable a ledge to be projected from a lower edge of one of the fence faces and for a gap, which is consistent with the spacing required between the male pins of a box joint, to be opened up. A tab is provided to enable a work piece to be placed in abutment therewith. This tab can be used as each slot is cut using a dado blade to set the appropriate spacing for the next slot. The ends of the fence are provided with end caps which have a 45° angle. These caps can be removed and switched about so that the fence can be used on either the left and the right hand sides of the saw table.

16 Claims, 8 Drawing Sheets

MITER FENCE-BOX JOINT FIXTURE

BACKGROUND OF THE INVENTION

1. Field of the Invention

The present invention relates generally to a miter fence for a table saw and more specifically to a combination of a miter fence and a box joint fixture which enables the cutting of both miters and box joints.

2. Brief Description of the Related Art

Various arrangements and accessories for a table saw have thus far been proposed. Such arrangements include a wood fence of the type disclosed in U.S. Pat. No. 5,337,641 issued on Aug. 16, 1994 in the name of Duginske. This document discloses a fence arrangement which is slidably connected to a miter head gauge. This gauge is pivotally mounted on a miter gauge bar which is slidably received in one of two table saw slots that are formed in the upper face of the saw table.

Another arrangement disclosed in U.S. Pat. No. 2,787,301 includes a miter gauge and an extension member which is provided with a pivoted stop member that allows the piece of wood being cut, to be set against the stop to facilitate reproducible positioning of successive pieces of work in the same position so as to undergo cutting at the same position.

However, these arrangements, while providing utility when cutting miters and the like, have suffered from the drawback that it is not possible to use the same fence arrangement for the cutting of both miters and box joints.

SUMMARY OF THE INVENTION

It is an object of the present invention to provide a miter fence arrangement which not only permits the cutting of miters but which also includes an arrangement which facilitates the cutting of the male and female pins necessary to form a box joint.

It is a further object of the present invention to provide a miter fence arrangement which can facilitate both the cutting of miters and box joints and which is both compact and easy to use.

It is yet a further object of the present invention to provide a miter fence arrangement which can be readily switched from left to right positions on the saw bench.

In brief, in order to enable both miters and box joints to be fabricated using the same piece of apparatus, a miter fence is provided with slidable portions which enable a ledge to be projected from a lower edge of one of the fence faces and for a gap, which allows for box joint cutting, to be opened up. A tab is provided to enable a work piece to be placed in abutment therewith. This tab can be used as each slot is cut using a dado blade to set the appropriate spacing for the next slot. The ends of the fence are provided with end caps which have a 45° angle. These caps can be removed and switched about so that the fence can be used on either the left or right hand sides of the saw table.

More specifically, a first aspect of the present invention resides in a miter fence arrangement which includes structure for cutting of a box joint fixture, comprising: a miter gauge pivotally mounted on a slide member adapted to be received in a guide slot formed in a saw table; a fence member detachably connected to the miter gauge so as to be laterally slidable with respect to the miter gauge, the fence member having first and second ends and comprising: an upper guide rail; first and second slidable members slidably mounted on a lower edge of the upper guide rail and selectively movable with respect to one another to open a variable length recess therebetween; third and fourth slidable members respectively disposed on lower faces of the first and second slidable members so as to be slidable in a lateral direction and to selectively enable a work piece support ledge to be projected from along the lower edge of the fence; and a tab connected with one of third and fourth slidable members, the tab being arranged to project out at a level above the work support ledge and to engage a work piece which is disposed on the work piece support ledge during box joint cutting.

In the above arrangement the upper guide rail comprises: at least one end cap disposed at an end thereof; and a support rod which is slidably received in the upper guide rail, the support rod being releasably connected to the at least one end cap and such that the end cap can be displaced from the end of the fence member in a manner to effectively increase the length of the fence.

In accordance with the present invention this miter fence further comprises: means defining at least one side guide slot along the length of a side face of the upper guide rail and along a side face of the at least one end cap; and a stop member which is slidably received in the at least one side guide slot and which can be selective fastened in a position anywhere along the length of the at least one side guide slot.

In addition to the above the miter fence according to the present invention further comprises: means defining at least one top guide slot along the length of an upper face of the upper guide rail and along a top surface of the at least one end cap; and a crown stop member which is slidably received in the at least one top guide slot and which can be selective fastened in a position anywhere along the length of the at least one top guide slot.

This miter fence further comprises a second end cap, the second cap having a side surface and a top surface in which the at least one side guide slot and the at least one top guide slot are formed.

BRIEF DESCRIPTION OF THE DRAWINGS

The various features and attendant advantages of the invention will become more clearly appreciated as a detailed description of the preferred embodiments of the invention is given with reference to the appended drawings in which.

DETAILED DESCRIPTION OF THE PREFERRED EMBODIMENTS

Figure 1:
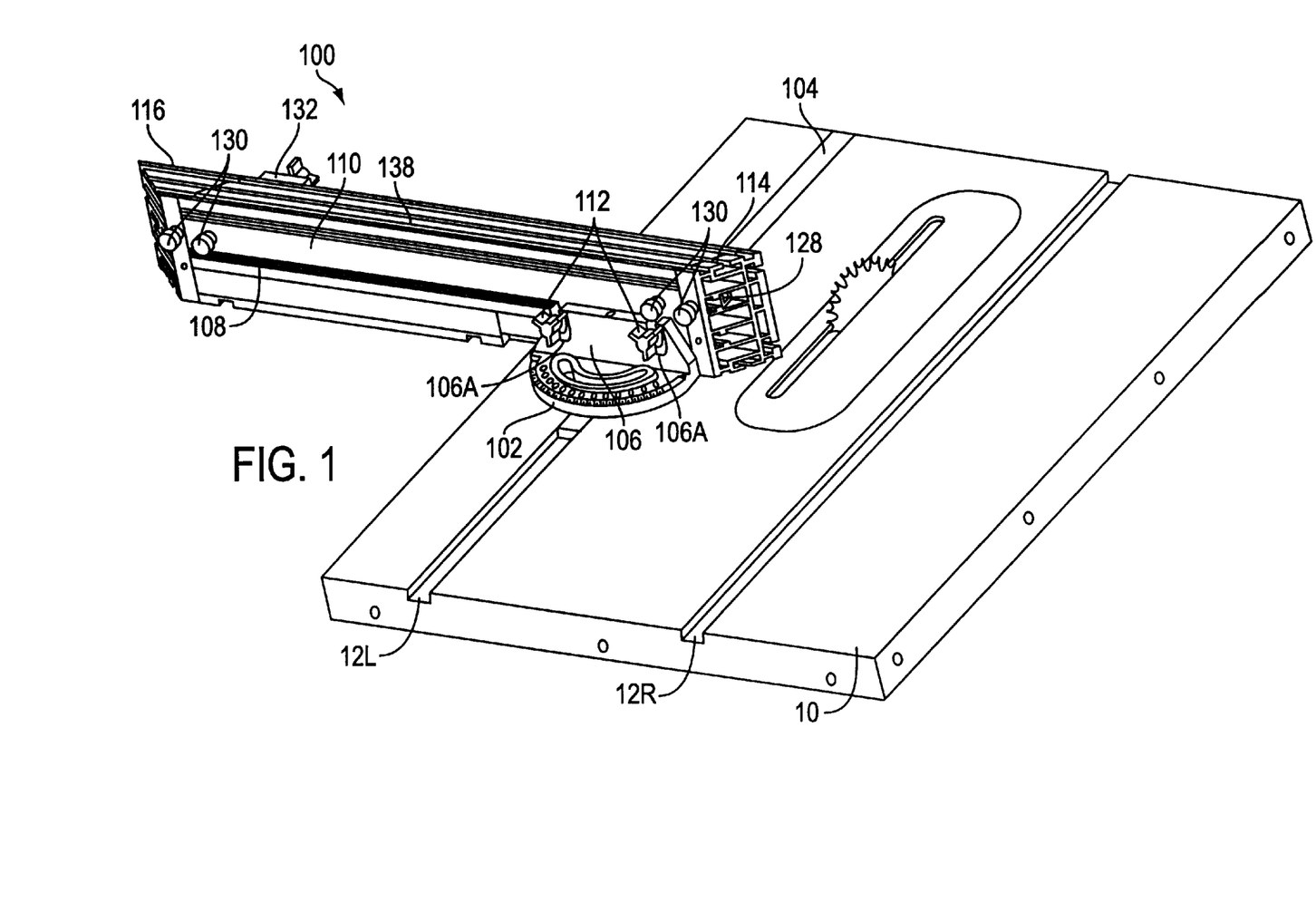
FIG. 1 is a perspective view of a miter fence arrangement according to the present invention mounted in one of the two tracks formed in the top of the saw table, and oriented essentially at right angles with respect to the cutting plane of a saw blade.
Figure 2:
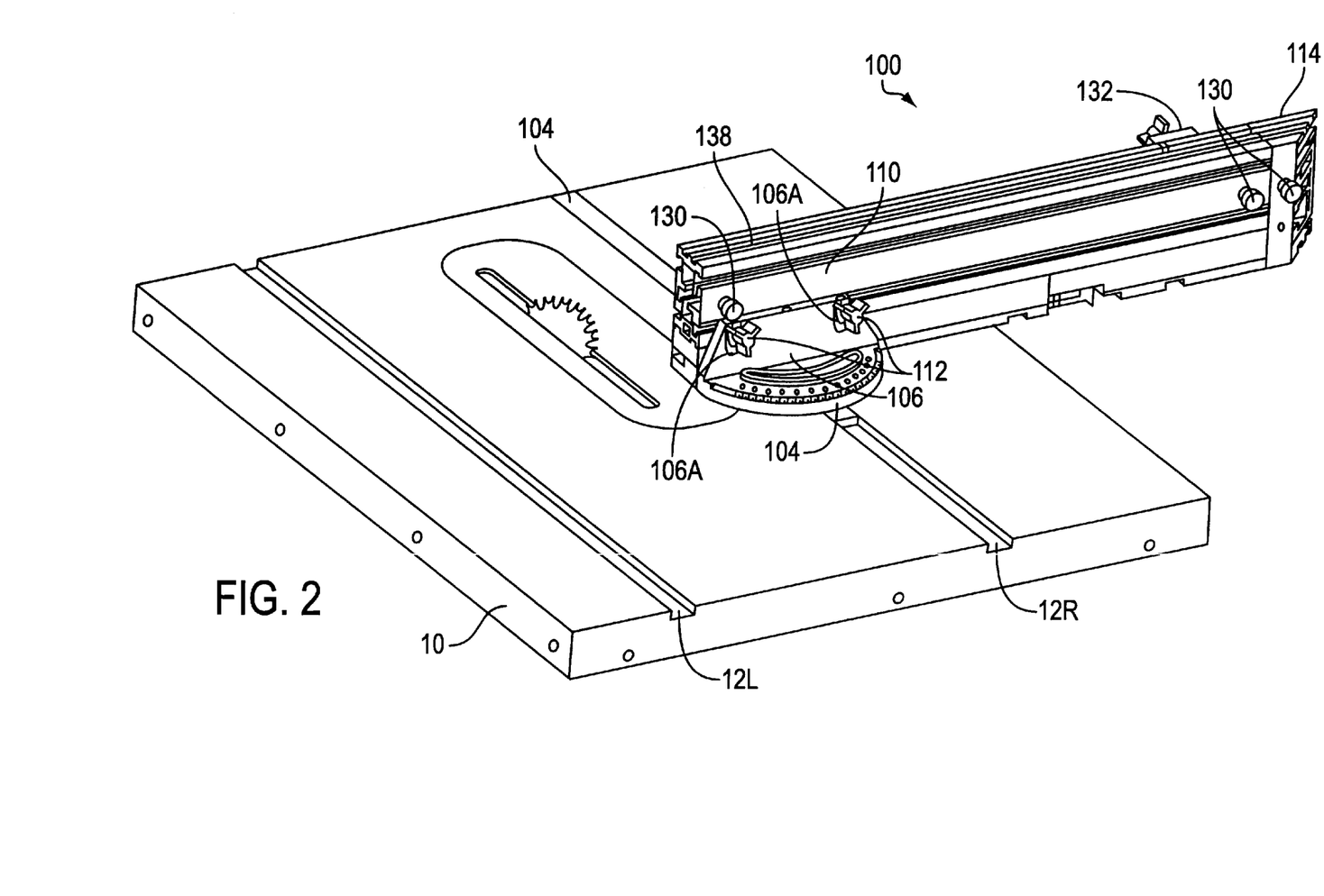
FIG. 2 is another perspective view of the miter fence arrangement according to the present invention showing the arrangement mounted in the other of the two guide tracks which are formed in the upper surface of the saw table, and showing one of the two end caps removed.

A preferred embodiment of the present invention will now be discussed with reference to FIGS. 1–8. In FIG. 1 a miter fence arrangement 100 according to the present invention, is shown disposed in an operative position on a saw table 10, in which two parallel guide slots 12L, 12R, are formed. The saw table construction and arrangement, in this embodiment, is of a conventional type having a motor and blade angle control (neither shown) operatively arranged therebeneath. Since, this facet of the table construction is not directly related with the invention it will not be discussed in any detail. It should be noted however, that the guard which normally encloses the saw blade, is omitted from the drawings for the sake of clarity.

A miter gauge 102 is pivotally mounted on a guide bar 104. In this instance the guide bar 104 is received in the left hand guide slot 12L. The upstanding front wall 106 of the miter gauge 104 is formed with a pair of parallel U-shaped recesses 106A which are adapted to receive connection bolts which are slidably received in an adjustment slot 108 that is formed along one face of an upper guide rail 110 of the miter fence 100. Wing nuts 112 are used to tighten the connection between the upper guide rail 110 and the miter gauge 102 and thus establish a snug connection therebetween after the position of the fence 100 with respect to the miter gauge 102 has been adjusted to the user's satisfaction.

In this embodiment, the fence 100 is comprised of the just mentioned upper guide rail 110, two end caps 114, 116 and two axially aligned calibrated members 118, 120. The two axially aligned calibrated members 118, 120 are connected to the lower side of the upper guide rail 110 so as to be slidable therealong in a manner which permits the separation of the two and the formation of a gap therebetween. The reason for this construction will become more clearly understood hereinlater.

In addition to the above mentioned construction, two more slidable members 122, 124, are mounted on the lower sides of each of the two calibrated members 118, 120, respectively. However, in this instance, these two lower "ledge" members 122, 124 are arranged to be laterally movable with respect to the members 118, 120 with which they are respectively associated, so that a work support ledge 126 can be selectively projected out from a lower edge of the fence 100 for box joint cutting (see FIG. 6 for example) or retracted for miter cutting (see FIGS. 3 and 4 for example).

A shaft or extension bar 128 is disposed through one of a plurality of channels which are defined within the upper guide rail 110. This extension bar 128 has a length selected to be longer than the guide rail 110 by a small amount, and such as to be receivable in a corresponding channel portion of each end cap 114, 116. Knurled screws 130 are provided in both the upper guide rail 110 and each of the end caps 114, 116 to allow for selective connection (clamping) of the extension bar 128. This arrangement allows for the bar 128 to be selectively rendered immovable with respect to the upper guide rail 110 and for one or both of the end caps 114, 116, to be clamped thereto. This not only provides means for retaining the end caps in position, but allows for the bar and one of the end caps 114, 116 to be moved relative to the guide rail 110, and or permit one of the end caps to be removed as required. The switching of the end caps 114, 116 required when switching from a left hand position to a right hand one or vice versa is also facilitated by this arrangement.

Figure 4:
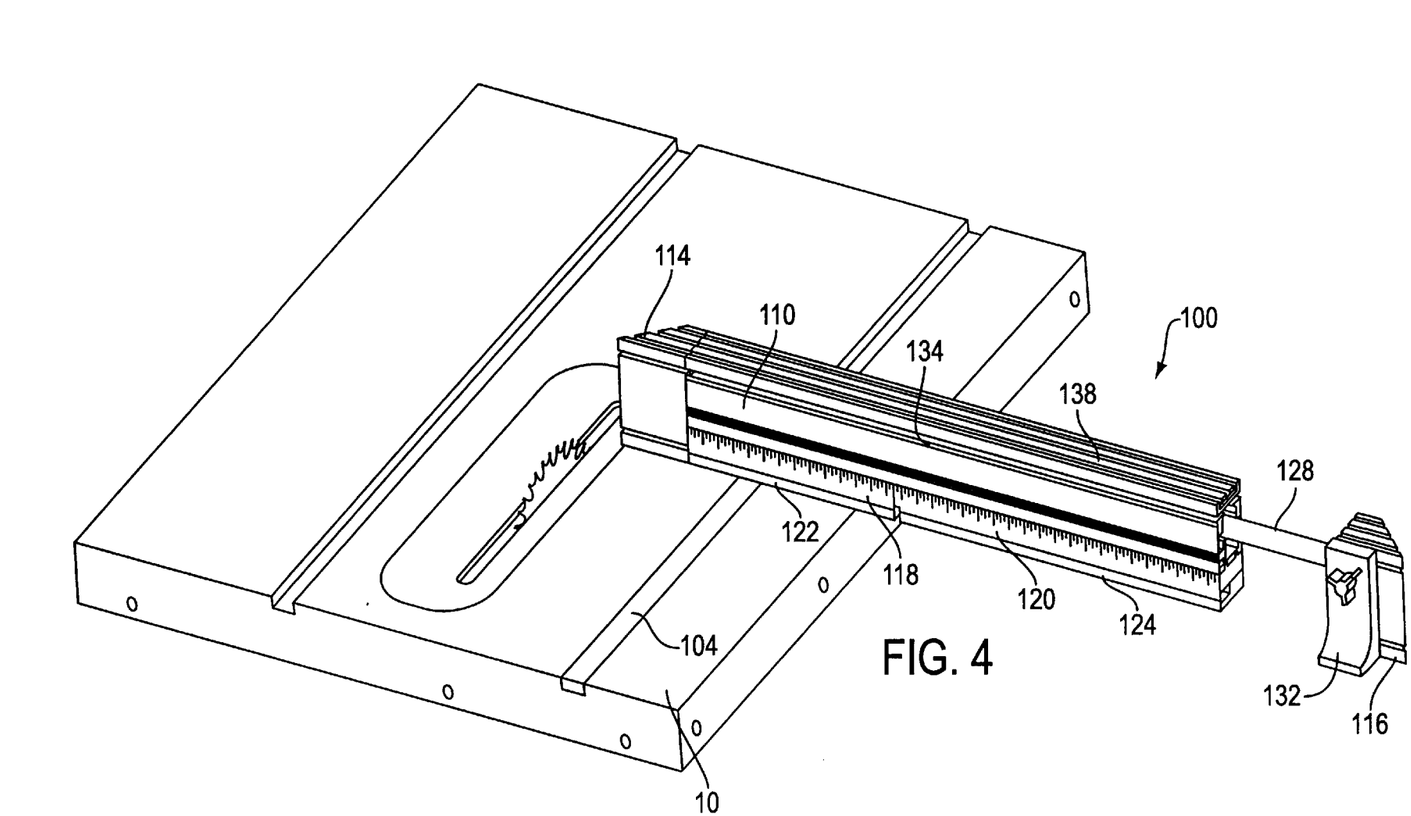
FIG. 4 is a perspective view showing an extension feature of the miter fence demonstrating how the effective length of the fence can be increased to accommodate long work pieces.

More specifically, as clearly illustrated in FIG. 4, the provision of the knurled screws 130 in combination with the slidable disposition of the extension bar 128, provides a simple arrangement which allows one of the end caps 116 to be moved out away from the end of the upper guide rail 110 and to allow the effective length of the miter fence 100 to be increased. In this particular embodiment, when the extension bar 128 is fully extended (and clamped in position) the length of the fence 100 is approximately doubled. Accordingly, even though the fence arrangement is quite compact, relatively long work pieces can be readily supported and cut.

Figure 3:
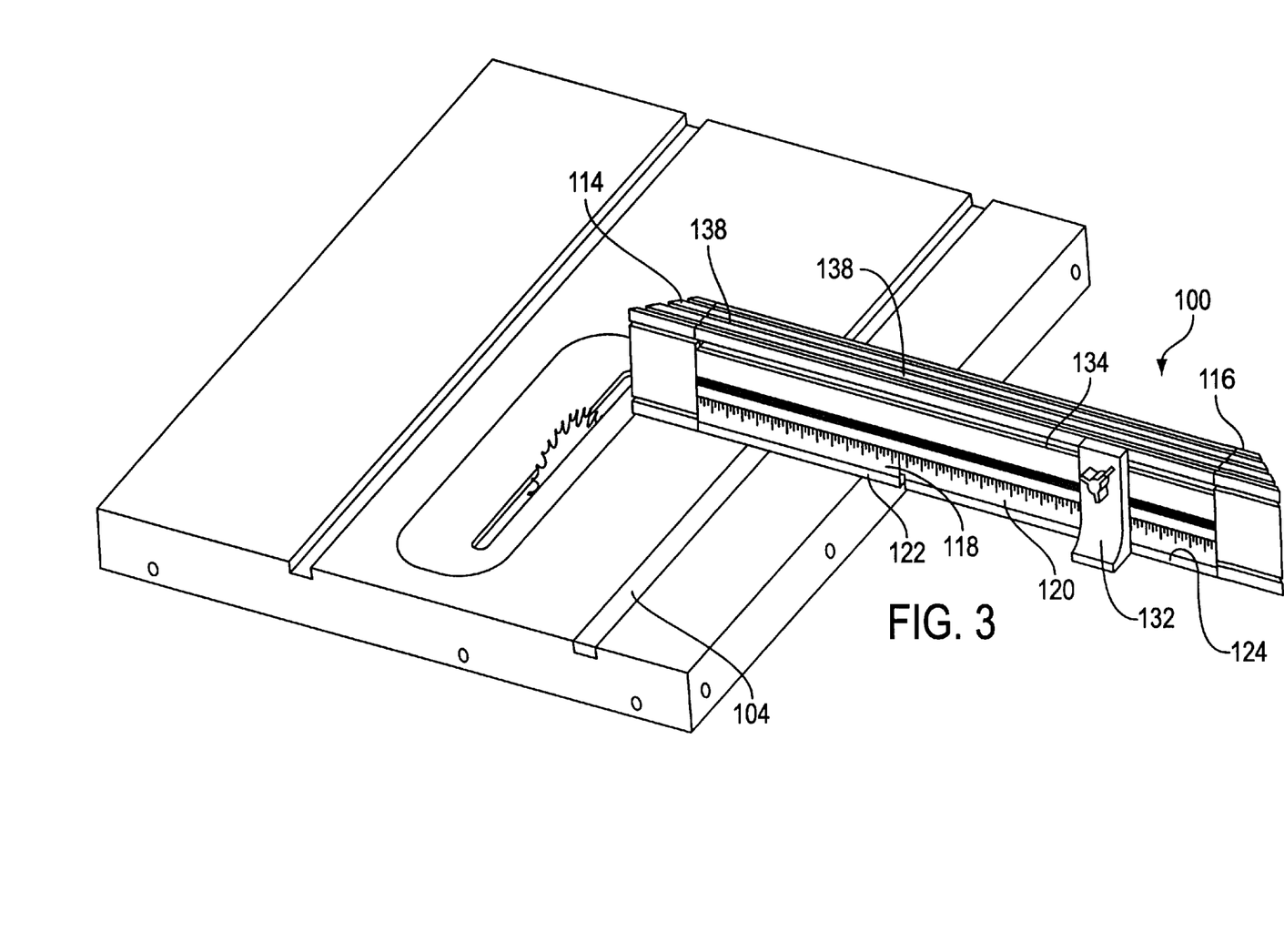
FIG. 3 is a perspective view of the miter fence arrangement according to the present invention showing the manner in which a stop member is used to set a length to the cutting blade.

As further illustrated in FIGS. 3 and 4, an adjustable stop 132 is slidably mounted in a guide slot 134 formed along one side of the upper guide rail 110. This stop 132 can be moved to a desired position and secured in place via the tightening of a wing nut 136. As will be further appreciated, especially from FIG. 4, the end caps 114, 116 are also formed with guide slots which correspond to that (viz., 134) formed in the guide rail 110 and which is used to support the stop 132. Accordingly, the stop 132 can be moved to a position wherein it is in fact supported on an end cap 114, 116, and therefore be moved via the provision of the extension bar 128, out to a position wherein it can be effectively used with longer work pieces.

Figure 5:
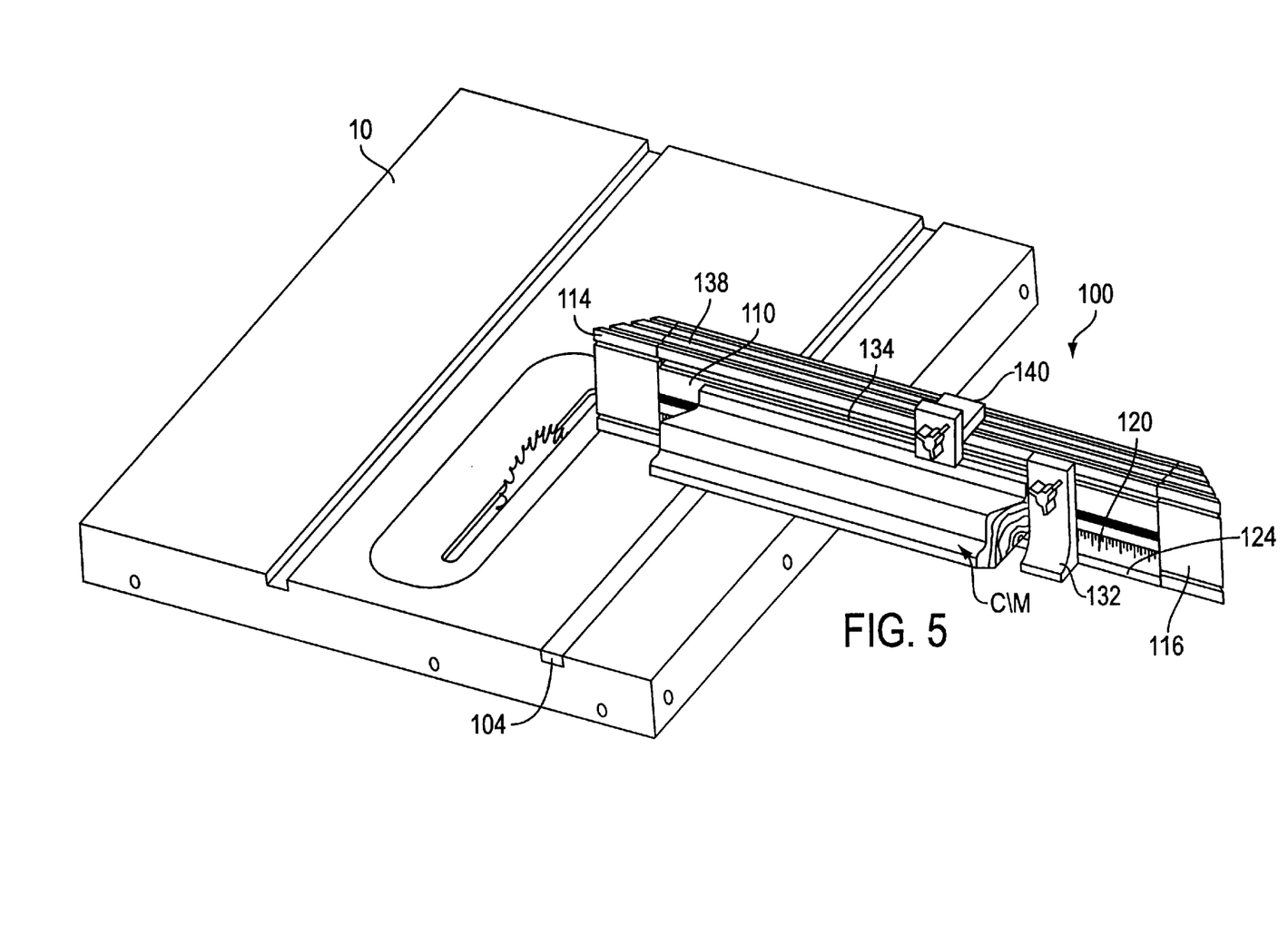
FIG. 5 is a perspective view showing a work piece disposed against the miter fence using a combination of a main stop and an adjustable crown stop.

The upper surface of the guide rail 110 is further formed with a guide slot 138 which is adapted to support a crown stop 140 in the manner illustrated in FIG. 5. The provision of this type of stop 140 allows the cutting of crown molding. As shown in FIG. 5, a crown molding C/M can be placed against the fence 100 in the same manner as it is installed, and thus eliminates the need to change the saw blade angle to obtain the correct compound cutting angle.

Figure 6:
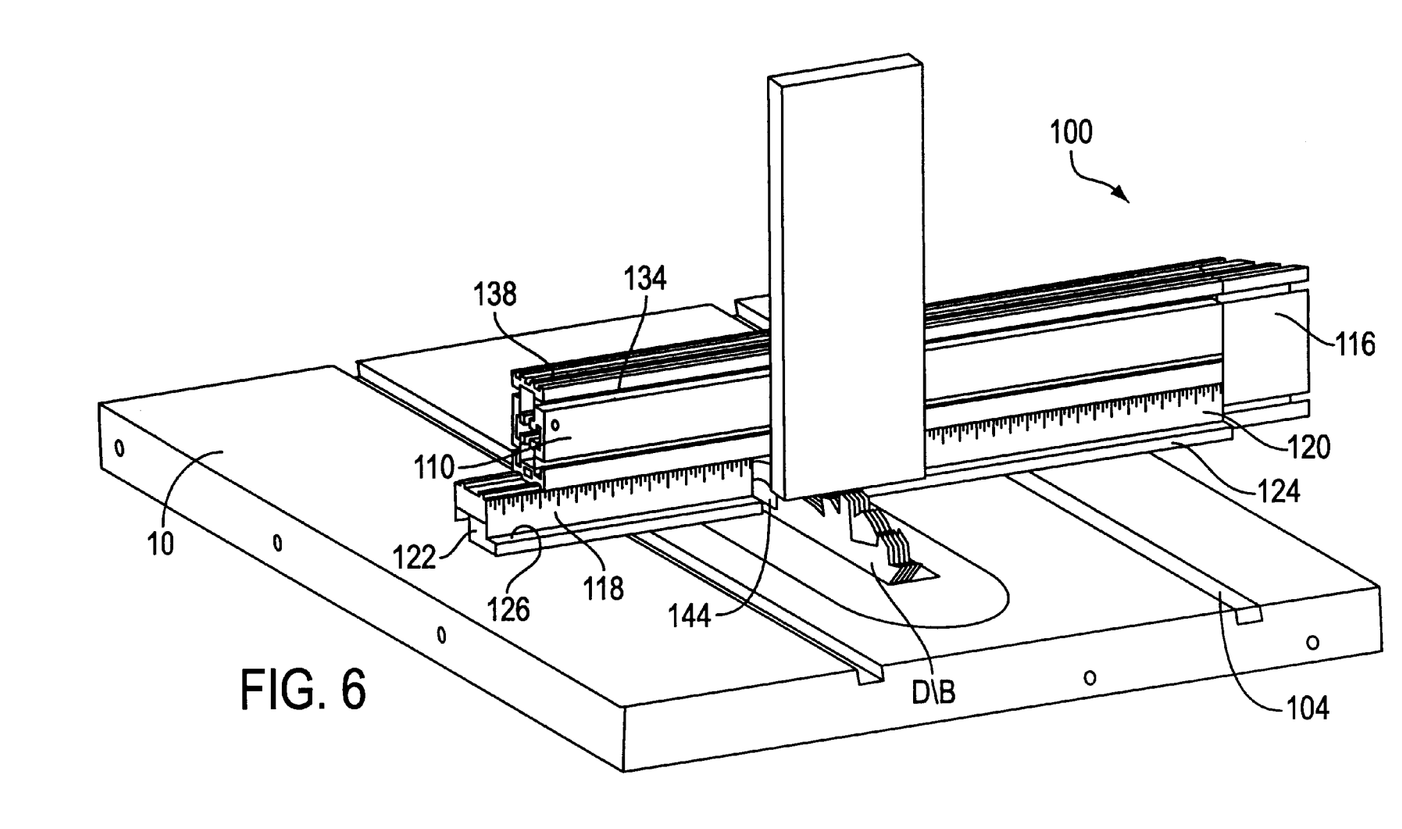
FIG. 6 is a perspective view showing the miter fence arranged to act as a box joint feature showing a work piece abutted against an adjustable tab ready for the cutting of a first female pin in the work piece.

The end caps 114, 116, can be removed as required and the fence proper moved along the miter gauge 104 by loosening the wing nuts 112 and moving the fence 100 from a position such as shown in FIG. 4 to that such as shown in FIG. 6 which is suited for cutting box joints. Once the fence 100 has been moved to a suitable position on the saw table 10, one of the end caps 114, 116 can be removed and one of the calibrated members 118, 120 slid away from the other to open up a suitable gap therebetween. In this case, the position of the calibrated member 118 which is shown extended out past the end of the guide rail 110, can be selected using the calibrations on the member 118 and thus facilitate the set up for cutting. Following this, the ledge members 122, 124 can be slid to positions wherein the ledge defining portions thereof, project out past the vertical faces of the calibrated members 118, 120 and form a ledge 126 upon which a work piece can be supported. A tab member 144 which is associated with the left hand edge member (as seen in the drawings) 122 is induced, through the sliding of this ledge member, to project out in a manner that the work piece can be moved into abutment therewith and therefore be positioned in a manner that an appropriate cut can be made using a dado blade D/B.

Figure 7:
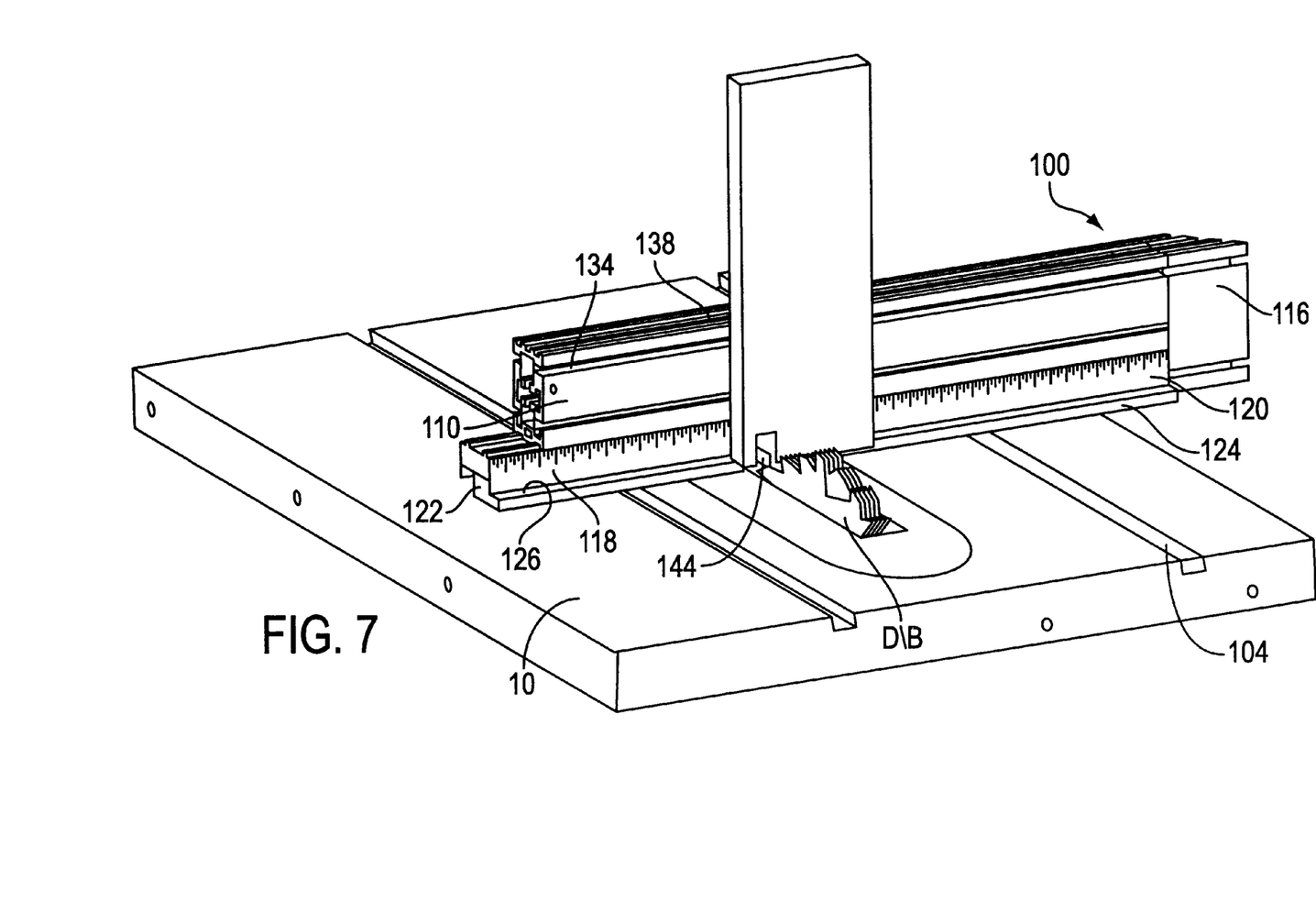
FIG. 7 is a perspective view showing the work piece repositioned using the adjustable tab following the cutting of the first opening, ready for the cutting of a second opening.
Figure 8:
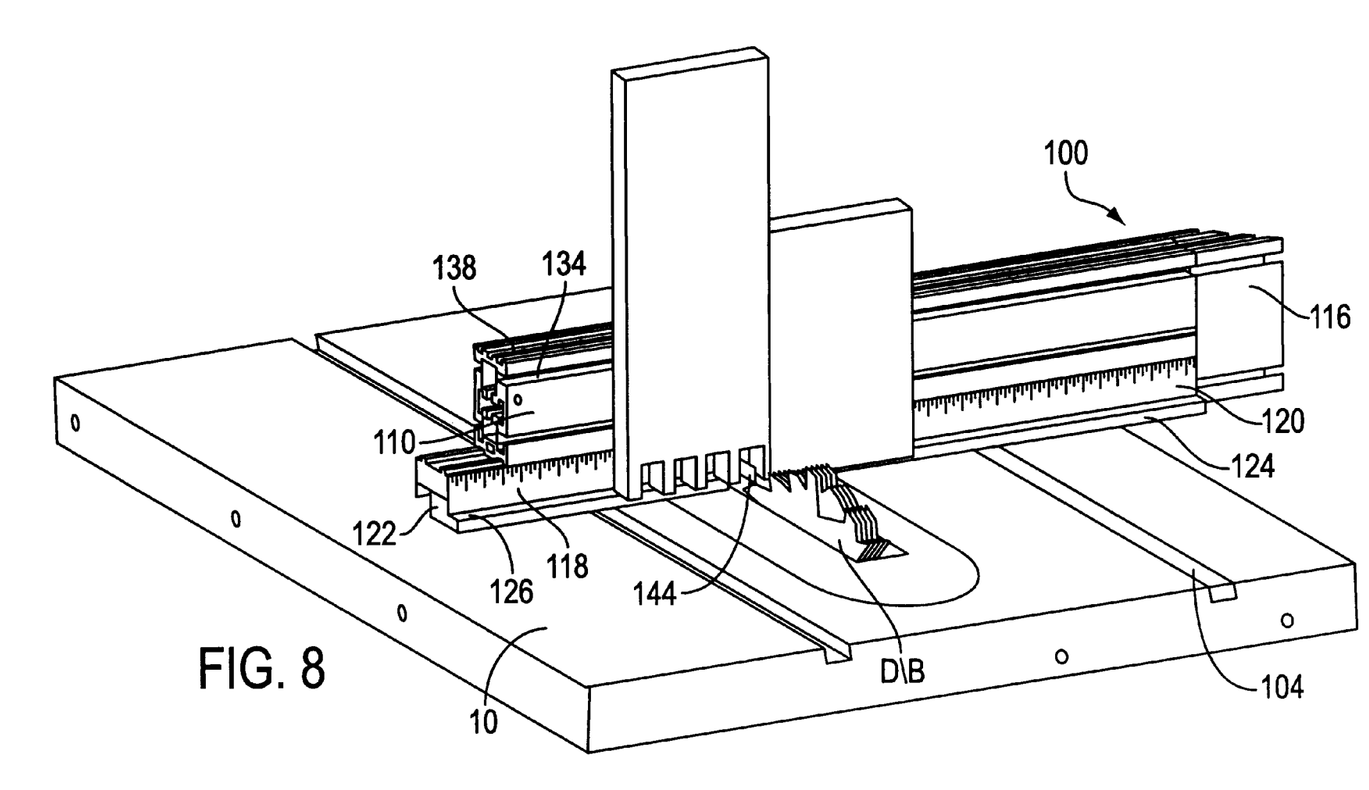
FIG. 8 is a perspective view showing the work piece following the cutting of a fourth opening in the work piece.

As will be appreciated from FIGS. 6–8, after one of the cuts is made, the work piece can be repositioned so that one face of the cut can be placed against the tab 144 and thus be positioned ready for the formation of a second cut etc. Uniform spacing of the cuts is therefore facilitated, and the quick and accurate formation of a box joint is rendered possible using the same piece of apparatus that miter cutting can be carried out.

Although only one embodiment has been described hereinabove, it is to be understood that various changes and modifications can be made without departing from the scope of the invention which is limited only by the appended claims.

What is claimed is:

1. A miter fence arrangement which includes structure for cutting of a box joint fixture, comprising:
   a miter gauge pivotally mounted on a slide member adapted to be received in a guide slot formed in a saw table;
   a fence member detachably connected to the miter gauge so as to be laterally slidable with respect to the miter gauge, the fence member having first and second ends and comprising:
   an upper guide rail;
   first and second slidable members slidably mounted on a lower edge of the upper guide rail and selectively movable with respect to one another to open a variable length recess therebetween;
   third and fourth slidable members respectively disposed on lower faces of the first and second slidable members so as to be slidable in a lateral direction and to selectively enable a work piece support ledge to be projected from along the lower edge of the fence; and
   a tab connected with one of third and fourth slidable members, the tab being arranged to project out at a level above the work support ledge and to engage a work piece which is disposed on the work piece support ledge during box joint cutting.

2. A miter fence arrangement as set forth in claim 1, wherein the upper guide rail comprises:
   at least one end cap disposed at an end thereof; and
   a support rod which is slidably received in the upper guide rail, the support rod being releasably connected to the at least one end cap and such that the end cap can be displaced from the end of the fence member in a manner to effectively increase the length of the fence.

3. A miter fence arrangement as set forth in claim 2, further comprising:
   means defining at least one side guide slot along the length of a side face of the upper guide rail and along a side face of the at least one end cap; and
   a stop member which is slidably received in the at least one side guide slot and which can be selective fastened in a position anywhere along the length of the at least one side guide slot.

4. A miter fence arrangement as set forth in claim 3, further comprising:
   means defining at least one top guide slot along the length of an upper face of the upper guide rail and along a top surface of the at least one end cap; and
   a crown stop member which is slidably received in the at least one top guide slot and which can be selective fastened in a position anywhere along the length of the at least one top guide slot.

5. A miter fence arrangement as set forth in claim 4, further comprising a second end cap, the second cap having a side surface and a top surface in which the at least one side guide slot and the at least one top guide slot are formed.

6. A fence arrangement for use on a saw table which has guide tracks formed on either side of an opening through which a saw blade can protect, comprising:
   a fence slidably supported on the saw table;
   a slidable member operatively connected with a lower edge of said fence so as to be selectively slidable along the lower edge and to open a space through which a blade can pass without engaging said fence; and
   a second slidable member slidably disposed on the lower edge of said fence, said second slidable member being movable with respect to the first said slidable member so as to enable a length of the space to be selectively adjusted.

7. A fence arrangement for use on a saw table which has guide tracks formed on either side of an opening through which a saw blade can project, comprising:
   a fence slidably supported on the saw table;
   a slidable member operatively connected with a lower edge of said fence so as to be selectively slidable along the lower edge and to open a space through which a blade can pass without engaging said fence; and
   a work support ledge, said work support ledge being defined by a member which is adapted to project out from a lower edge of the slidable member.

8. A fence arrangement as set forth in claim 7, wherein said work support ledge is formed on a laterally movable member operatively supported on the lower edge of said slidable member.

9. A fence arrangement for use on a saw table which has guide tracks formed on either side of an opening through which a saw blade, which is operatively connected with a motor that is below the table, can project from below the table, comprising:
   a fence slidably supported on the saw table;
   a slidable member operatively connected with a lower edge of said fence so as to be selectively slidable along the lower edge and to open a space in the lower surface of the fence into which the saw blade can project without engaging a lower edge of said fence when the fence is moved over the blade;
   an end cap which is detachably connected to an end of said fence, said end can being detachably connected to an end of said fence and having a face which is angled with respect to a major front surface of said fence,
   an extension structure which is selectively connectable to the end cap and which is slidably movable with respect to said fence to permit the end cap to be supportingly moved away from an end of said fence in a manner which effectively increases the length of the fence; and
   guide slot means formed in said fence and the end cap, for supporting a stop at a position which can be on the fence or on the end cap.

10. A fence arrangement as set forth in claim 9, further comprising a tab which is operatively connected with said fence and against which a work piece can be disposed in order to hold the work piece in a predetermined position ready for cutting by a predetermined type of saw blade.

11. A fence arrangement as set forth in claim 10, wherein said predetermined type of saw blade is a dado type blade arrangement.

12. A fence arrangement as set forth in claim 9, further comprising a miter gauge which has a guide bar that can be slidably disposed in either of the guide tracks formed in the saw table, and about which the miter gauge is pivotal, said fence being detachably connected to said miter gauge and laterally movable with respect thereto so that the position of the fence can be adjusted with respect to the saw blade opening in the saw table, from a position suitable for cutting miters to a position suitable for cutting box joints.

13. A method of cutting wood on a saw table having a saw blade operatively mounted thereon, said saw blade extending up through an opening formed thereon and operatively connected with a motor which is located below the saw table, comprising the steps of:

placing a work piece against a fence member which is supported on the saw table through a miter gauge;

adjusting the fence to a position wherein it is angled with respect to the saw blade and wherein miter cuts can be made in the work piece; or adjusting the fence to a position wherein a major face of the fence faces a cutting edge of the saw blade;

adjusting the fence so that a space on the lower edge of the fence through which the blade can pass when the fence is moved along the top of the table and over the blade in a manner which facilitates the cutting of a workpiece which disposed against the major face, is aligned with the blade;

adjusting the position of a tab, against which a workpiece can be abutted, with respect to the saw blade so that a predetermined offset is achieved;

abutting a preselected surface of the workpiece against the tab member and sliding the fence to the saw blade; or abutting the preselected surface of the workpiece against the tab while the workpiece is supported on a ledge which projects out from the fence and which supports the work piece at a predetermined height above the saw table and sliding the fence to the saw blade.

14. A method of cutting as set forth in claim 13, further comprising the step of adjusting a stop member which is slidably movable along the fence to a preselected position, and placing the workpiece against the stop to facilitate miter cutting of the same.

15. A method of cutting wood on a saw table having a saw blade operatively mounted thereon, comprising the steps of:

placing a work piece against a fence member which is supported on the saw table by a miter gauge;

adjusting the fence to a position wherein it is angled with respect to the saw blade and wherein miter cuts can be made in the work piece; or adjusting the fence to a position wherein a major face of the fence faces a cutting edge of the saw blade;

adjusting the fence so that a space on the lower edge of the fence through which the blade can pass when the fence is moved toward the blade and thus facilitate the cutting of a workpiece which disposed against the major face, is aligned with the blade; and supporting the work piece on a ledge which projects out from the fence and which supports the work piece at a predetermined height above the saw table.

16. A method of cutting as set forth in claim 15, wherein said step of abutting the preselected surface of the workpiece against the tab is carried out while supporting the workpiece on the ledge.

* * * * *